US008606748B2

(12) United States Patent
Betts et al.

(10) Patent No.: US 8,606,748 B2
(45) Date of Patent: Dec. 10, 2013

(54) CUSTOMER DETAIL PUBLICATION IN AN INTERNAL UDDI

(75) Inventors: Christopher Betts, Mount Dandenong (AU); Tony Rogers, Rowville (AU)

(73) Assignee: CA, Inc., Islandia, NY (US)

( * ) Notice: Subject to any disclaimer, the term of this patent is extended or adjusted under 35 U.S.C. 154(b) by 2179 days.

(21) Appl. No.: 11/093,316

(22) Filed: Mar. 30, 2005

(65) Prior Publication Data

US 2005/0234925 A1 Oct. 20, 2005

Related U.S. Application Data

(63) Continuation of application No. 10/888,722, filed on Jul. 9, 2004, now abandoned.

(60) Provisional application No. 60/486,721, filed on Jul. 11, 2003.

(51) Int. Cl.
*G06F 17/30* (2006.01)
(52) U.S. Cl.
USPC ............................. 707/607; 709/201; 709/220
(58) Field of Classification Search
USPC .................... 707/4, 10, 999.004, 999.01, 607; 709/220, 201
See application file for complete search history.

(56) References Cited

U.S. PATENT DOCUMENTS

2003/0004746 A1* 1/2003 Kheirolomoom et al. ........ 705/1
2003/0028451 A1* 2/2003 Ananian .......................... 705/27
2003/0110242 A1* 6/2003 Brown et al. ................. 709/222
2003/0187839 A1* 10/2003 Zhang et al. ..................... 707/4
2004/0128541 A1* 7/2004 Blakley et al. ................ 713/201

OTHER PUBLICATIONS

Bently T., LeClair D., "Leveraging Directory Technology for Enterprise UDDI", Jan. 11, 2002, Computer Associates.*
M. Jeckle, B. Zengler; "Active UDDI—An Extension to UDDI for Dynamic and Fault-Tolerant Service Invocation"; Jan. 1, 2003; Springer Berlin / Heidelberg; vol. 2593/2003; p. 91-99.*
Sean Macroibeaird, Anne Thomas Manes, Scott Hinkelman, Barbara McKee; "Using UDDI to Find ebXML Reg/Reps"; May 8, 2001; UN/CEFACT and OASIS.*
Tim Bentley, Don Leclair: "Leveraging Directory Technology for Enterprise UDDI", Computer Associates White Paper, Online, Jan. 11, 2002, pp. 1-8, Retrieved from Internet: http://web.archive.org/web/20040904142511/http://www3.ca.com/Files/WhitePapers/WP_Leveraging_Directory_Tech_Enterprise_UDDI.pdf.
UDDI.ORG: "White Paper UDDI Technical White Paper", Online, Sep. 6, 2000, pp. 1-12, Retrieved from Internet: http://web.archive.org/web/20040920201621/http://www.uddi.org/pubs/Iru_UDDI_Technical_White_Paper.pdf.
Sushil Jajodia et al.: "Toward a Multilevel Secure Relational Data Model", Sigmod Record, Proc. ACM Sigmod International Conference on Management Data, Denver, Colorado, May 1991, pp. 50-59.

* cited by examiner

*Primary Examiner* — Dennis Truong
(74) *Attorney, Agent, or Firm* — Baker Botts, LLP

(57) ABSTRACT

A method for providing a private UDDI repository including providing a UDDI repository, providing one or more user accounts corresponding to one or more users, and granting the one or more users access to the one or more users' respective user accounts.

28 Claims, 3 Drawing Sheets

CUSTOMER DETAIL PUBLICATION IN AN INTERNAL UDDI

REFERENCE TO RELATED APPLICATION

The present application is based on provisional application Ser. No. 60/486,721, filed Jul. 11, 2003, the entire contents of which are herein incorporated by reference.

BACKGROUND

1. Technical Field

The present disclosure relates to UDDI and, more specifically, to publication in an internal UDDI.

2. Description of the Related Art

Web services present a new way for computer to communicate with each other. Web services are software systems that can be identified by Universal Resource Identifiers (URI), analogous to identification of websites by Uniform Resource Locator (URL). Web services generally perform specialized functions or provide access to information. Web services generally contain public interfaces and bindings that enable other software systems (such as other web services) to seamlessly utilize its functionality. In this way, web services are transforming the way modern enterprises interact and share information.

Some cross-platform programming languages have been developed to facilitate communication between various different computer systems. A popular example of one such programming language is Extensible Markup Language (XML). Many web services interact with one another using XML which is a human readable format. In addition, web services are also used in non-English environments through the use of Unicode which is a universal language code.

Web services are well suited for access over computer networks such as intranets and the internet. Many web services communicate via port 80, the standard "world wide web" internet port. An enterprise may make a web service available over a corporate intranet for the use of enterprise employees. Alternatively, an enterprise might make a web service publicly available worldwide over the internet.

However, a software system seeking to access a web service should generally first be able to locate and connect to the web service. This may require knowledge of the web service's URI. If a URI is not known, it may still be possible to locate that web service. The process of locating and connecting to a web service is commonly known as discovery and integration. Universal Description, Discovery and Integration (UDDI) standards have been adopted to standardize and facilitate discovery and integration.

Computers can use UDDI to find the location of web services without necessarily knowing its URI, in a manner similar to looking for businesses in a yellow pages phone book. UDDI also includes a standardized vocabulary for describing the functionality of web services. UDDI repositories generally are provided as directories in which information pertaining to an enterprise, its services, technical information, and information about specifications for the enterprise's web services can be looked up.

Enterprises may maintain public and/or private UDDI repositories. An enterprise may wish to make a UDDI repository public if it seeks to offer the listed web services to the public. Alternatively, an enterprise may wish to maintain a private UDDI repository. Private UDDI repositories may be made available to a select group of users, for example, the employees, customers or other groups of enterprise constituency.

An enterprise may wish to keep a UDDI repository private when web services listed within it are of a sensitive nature, for example, web, services designed to facilitate commercial banking transactions. Even though the web services themselves may be private and only accessible to users with appropriate security privileges, publicizing the URI of a private web service may make that web service a target for hackers and/or malicious attack.

A traditional model for UDDI calls for a small number of very large public UDDI repositories. This model facilitates discovery of web services but does not provide for private UDDI repositories where a list of sensitive web services can be provided to select users.

While private UDDI repositories facilitate users discovery of internal web services within their own enterprise, users may also wish to have their private UDDI repositories facilitate discovery of external web services that are maintained by other enterprises but made available to the users. To accomplish this, the users may list the external web services within their own private UDDI repositories. However problems are likely to emerge as changes are made to the external-web service, for example, the URI of the external web service may change and the private UDDI repositories may not reflect this change thereby preventing discovery of the external web service.

One way around this problem is to allow the other enterprise access to the private UDDI repository so the other enterprise can update information related to the web services they maintain. However this alternative creates a security risk as users from the other enterprise will be allowed to access the private UDDI repository and potentially view sensitive information that may relate to private internal web services and/or private external web services maintained by a third enterprise.

SUMMARY

A method for providing a private UDDI repository including providing a UDDI repository, providing one or more user accounts corresponding to one or more users, and granting the one or more users access to the one or more users' respective user accounts.

A system for a private UDDI repository including a UDDI repository, one or more users, and one or more user accounts corresponding to the one or more users, wherein the one or more users may access the users' corresponding user accounts.

A computer system including a processor and a program storage device readable by the computer system, embodying a program of instructions executable by the processor to perform method steps for providing a private UDDI repository. The method includes providing a UDDI repository, providing one or more user accounts corresponding to one or more users, and granting the one or more users access to the one or more users' respective user accounts.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
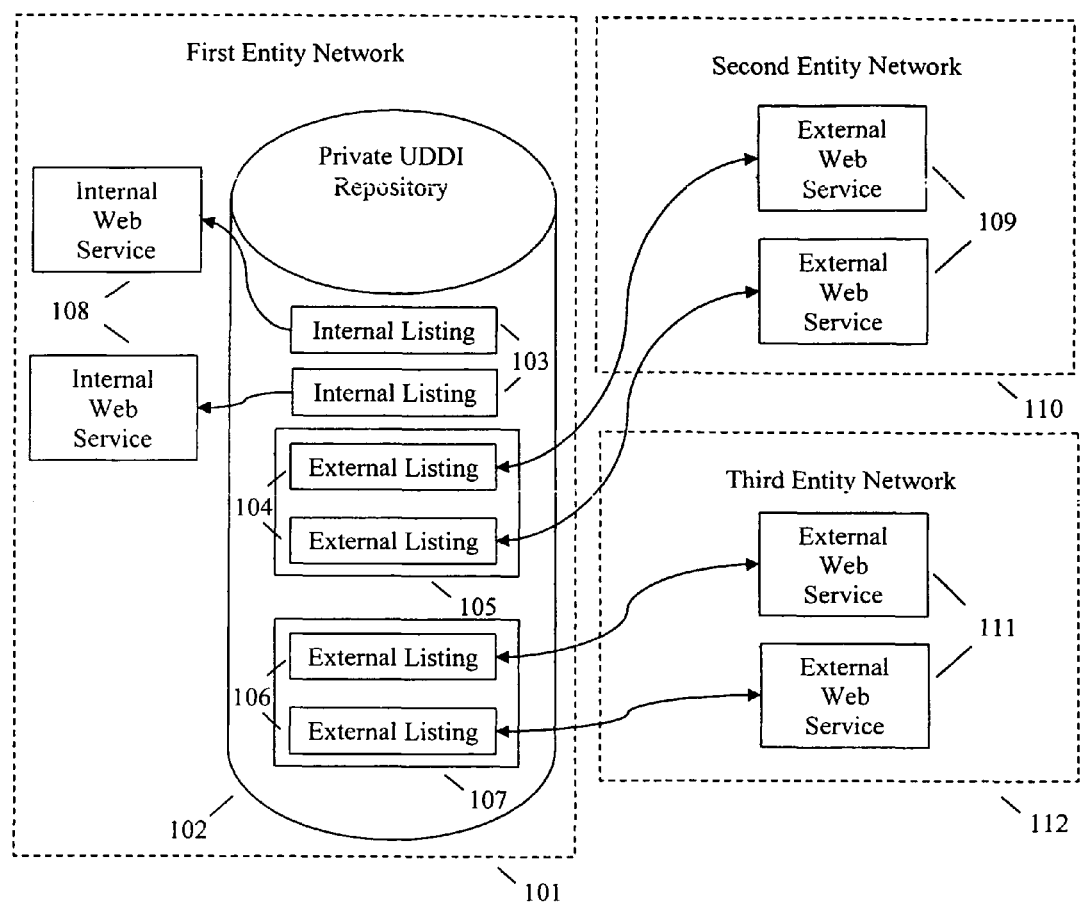
FIG. 1 is a block diagram showing the private UDDI repository according to embodiments of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure include a private UDDI repository wherein a user who is not granted access to utilize the private UDDI repository may be granted limited access to the private UDDI repository for the purpose of setting and/or updating listings within the private UDDI repository that relate to information pertaining to the user.

FIG. 1 is a block diagram showing the private UDDI repository according to embodiments of the present disclosure. A private UDDI repository 102 maintained by a first entity may be located within a network of the first entity 101. The private UDDI repository 102 may use a secure X.500 directory and may utilize a Lightweight Directory Access Protocol (LDAP) directory service.

X.500 is a common set of standards pertaining to directories. LDAP is a protocol for quickly and easily accessing distributed directory services. LDAPs are commonly used in association with X.500 directories. LDAPs communicate using TCP/IP transfer services or similar transfer services making LDAPs well suited for use over the internet or private company intranets. Such X.500/LDAP directories frequently include internal security features that may be useful for controlling user access.

The private UDDI repository 102 may contain internal web service listings 103 for the facilitation of discovery of internal web services 108. The private UDDI repository 102 may be fully accessible only to particular users with sufficient privileges to access the private UDDI repository 102. For example, only employees of the first entity may be able to fully access the private UDDI repository 102. According to one embodiment of the present disclosure, the private UDDI repository 102 is only available via a private intranet maintained by the first entity and/or over a secure network connection, for example a virtual private network (VPN).

By utilizing a private UDDI repository 102, the first entity can protect the integrity of sensitive information that may be listed within the private UDDI repository 102. For example, users not affiliated with the first entity may not be able to access the private UDDI repository 102. Sensitive information contained within the private UDDI repository 102 may include the URIs of sensitive internal web services 108 and/or sensitive information pertaining to the business of the first entity.

The internal web services 108 that may be listed 103 within the private UDDI repository 102 may perform sensitive functions that the first entity would not want users not affiliated with the first entity to have access to. These internal web services 108 may be hosted on servers located within the first entity's network 101. The internal web services 108 may include independent user authentication, for example, a login procedure, to prevent unauthorized access, however, denying public access to the private UDDI repository 102 may add an extra level of protection. For example, denying public access to the private UDDI repository 102 may forestall attempts to access the sensitive internal web service 108 by circumventing independent user authentication. For example, denying public access to the private UDDI repository 102 may forestall malicious attacks such as, for example, a denial of service attack that may target the sensitive internal web service's 108 URI.

The private UDDI repository 102 may contain one or more user accounts 105 and 107. These user accounts 105 and 107 may form a, protected space, such as, for example, a sandbox or a data subtree, that may be isolated from the rest of the private UDDI repository 102. According to an embodiment of the present disclosure, the user accounts 105 and 107 may by physically located on one or more separate servers, for example one server for each user account 105 and 107. These servers may be connected via a network connection that may be secured, for example, using a firewall. Alternatively, the user accounts 105 and 107 may be located on the same server as the rest of the private UDDI repository 102 and contain protective measures such that a user granted access to a user account 105 and 107 may not be able to access the internal web service listings 103 within the private UDDI repository 102 and/or any other user accounts 105 and 107 that the user has not specifically been granted access to.

A user, for example, a user from a second entity (second entity user), may be granted access to a user account 105 and 107, for example a second entity user account 105. The second entity user may then view, add, remove, modify (collectively referred to as manage) and/or create external web service listings 104 within the second entity user account 105. The second entity user, however, may be prevented from accessing any information that may be on the private UDDI repository 102 other than that information which is located within the second entity user account 105. For example, the second entity user may be prevented from accessing internal web service listing's 103 and/or user accounts associated with other users, for example as third entity user account 107.

For example, the second entity user may create and/or manage one or more external web service listings 104 within the second entity user account 105 that provide information pertaining to external web services 109 maintained by the second entity. These second entity external web services 109 may be located within a network 110 maintained by the second entity. By so creating and/or managing the second entity external web service listings 105, the second entity may allow first entity users the ability to discover second entity web services 109 by accessing the first entity private UDDI repository 102.

The second entity may thereby make their web services 109 available to first entity users without running the risk of exposing the second entity listings 104 to the general public or any other, entity and the first entity may thereby allow the second entity to make their web services 109 available to the first entity users without running the risk of exposing internal web service listings 103 and/or external web service listings associated with another entity external web service located on another user account to the users of the second entity. For example, a second entity user may be prevented from viewing third entity external web service listings 106 within a third entity user account 107 that may be associated with a third entity external web service 111 that may be located on a server within a third entity network 112.

An entity that maintains a private UDDI repository 102, for example the first entity, may store information on the private UDDI repository 102 other than/in addition to internal web service listings 103. For example, the first entity may store external web service listings that are not within a user account 105 and 106. Such external web service listings may be maintained by the first entity itself. For example, the first entity may store information pertaining to the first entity's business. The information on the private UDDI repository 102 other than/in addition to internal web service listings 103 may be afforded the same protection against being accessed by the public and/or entities, such as the second and third entity, with user accounts 105 and 106, that is afforded to the internal web service listings 103 as discussed above.

Additionally, entities, such as the second and third entity, with user accounts 105 and 106 may additionally store information other than/in addition to external web service listings 104 and 106 within their respective user accounts 105 and 107. This information may be afforded the same protection against being accessed by the public and/or other entities. Examples of such information include information pertaining to the entity's business, for example, confidential price lists of the entity's products.

By allowing external entities, for example the second and third entity, to create and/or manage the external web service listings 104 and 106 and information on the private UDDI repository 102 that relates to their own entity, the first entity may enjoy a more accurate private UDDI repository 102 and potentially lower maintenance burden while the external entities may enjoy the ability to control what web service listings and/or information relating to their entity is placed on the first entity's private UDDI repository 102.

An example of how the private UDDI repository 102 of an embodiment of the present disclosure may be used relates to a large company implementing electronic billing. The company may have thousands of customers many of whom would like to receive invoices electronically to increase efficiency. Many of these customers may maintain web services for receiving electronic invoices, but do not wish to list these web services on a public UDDI repository for security reasons such as those discussed above.

Rather than try to collect and maintain the web service details of each customer desiring electronic invoices, the company can establish a set of user accounts, one for each customer desiring electronic invoices. Those customers may then create and/or maintain external web service listings within those user accounts to allow for the discovery of their web services for receiving electronic invoices. For example, those customers may update their external web service listings as necessary.

Figure 2:
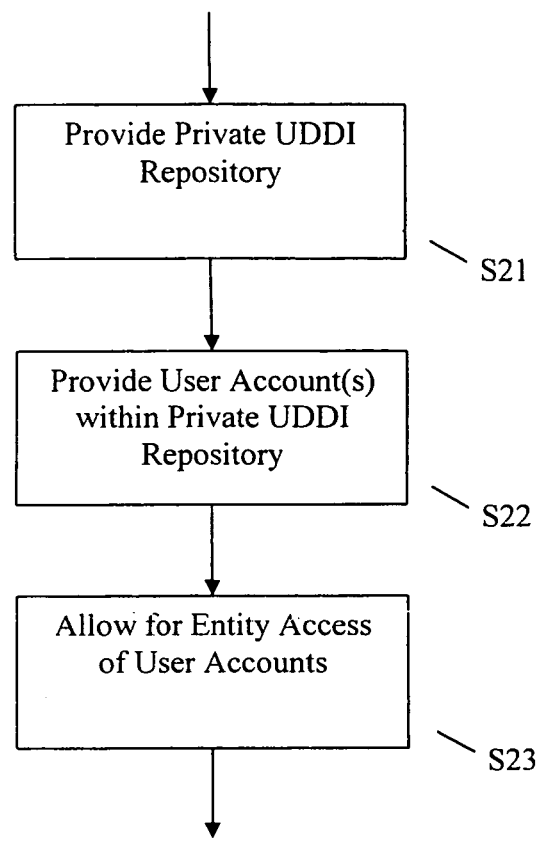
FIG. 2 is a flow chart showing a method for creating a private UDDI repository according to an embodiment of the present disclosure.

FIG. 2 is a flow chart showing a method for providing a private UDDI repository according to an embodiment of the present disclosure. A private UDDI repository may be provided (Step S21). The private UDDI repository may be based on a secure X.500/LDAP directory. One or more user accounts may be provided within the private UDDI repository (Step S22) for corresponding one or more users. Each user may be granted access to the user's respective user account (Step S23). Security features included with the secure X.500/LDAP directory may be used to provide for this restricted access. Access to the user's respective user account may include access to create and/or manage listings to web services maintained by that user and/or other information.

Figure 3:
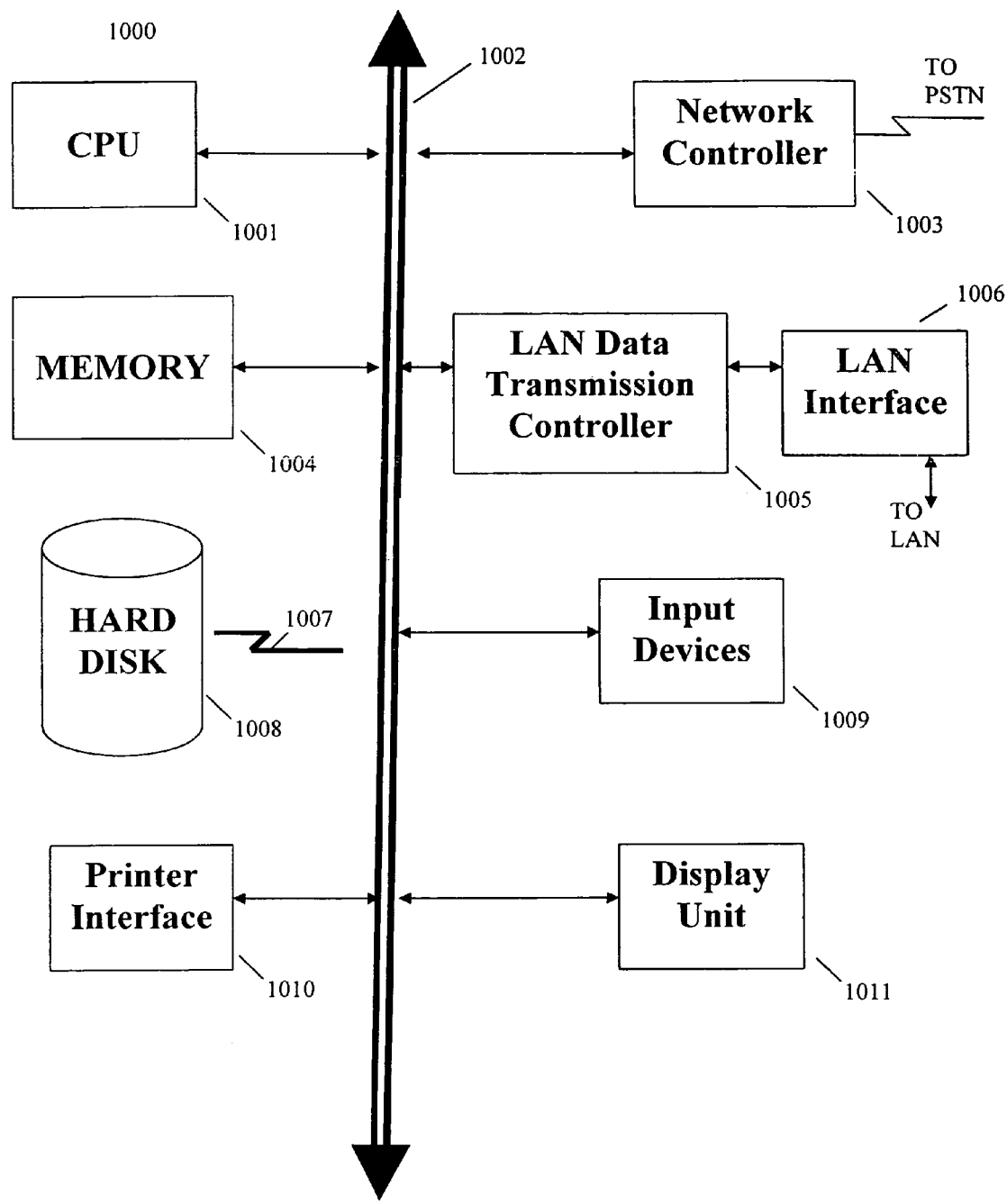
FIG. 3 shows an example of a computer system capable of implementing the method and apparatus according to embodiments of the present disclosure.

FIG. 3 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal buss 1002, and one or more input devices 1009, for example, a keyboard, mouse etc. As shown, the system 1000 may be connected to a data storage device, for example, a hard disk, 1008 via a link 1002.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for providing a private UDDI repository, comprising:

providing a processor and a program of instructions encoded on a program storage device, the program of instructions comprising a UDDI repository for a first entity that manages the UDDI repository, the UDDI repository comprising a plurality of internal web service listings, the plurality of internal web service listings facilitating discovery of a plurality of internal web services associated with the first entity;

storing, at the UDDI repository for the first entity, one or more user accounts corresponding to one or more users affiliated with a second entity, the one or more user accounts comprising a plurality of external web service listings isolated from the plurality of internal web service listings, the external web service listings facilitating discovery of a plurality of external web services associated with the second entity; and maintaining the external web service listings associated with the second entity by granting the one or more users affiliated with the second entity limited access to the one or more users' respective user accounts.

2. The method of claim 1, wherein the UDDI repository comprises an X.500 compliant directory.

3. The method of claim 1, wherein the UDDI repository comprises an LDAP directory service.

4. The method of claim 1, wherein the UDDI repository is not publicly accessible.

5. The method of claim 4, wherein the UDDI repository is accessible to users affiliated with the first entity that manages the UDDI repository.

6. The method of claim 5, wherein the users affiliated with the first entity may create and/or manage the plurality of internal web service listings and/or information within the UDDI repository.

7. The method of claim 1, wherein the granting the one or more users access to the one or more users' respective user accounts comprises allowing the one or more users to create and/or manage the plurality of external web service listings and/or information within the one or more users' respective user accounts.

8. The method of claim 1, wherein the one or more users do not have access to the plurality of internal web service listings and/or information within the UDDI repository that is not also within the one or more users' respective user accounts.

9. The method of claim 1, wherein users who are not affiliated with the first entity that manages the UDDI repository and are not provided with a corresponding user account do not have access to the UDDI repository.

10. A system for a private UDDI repository, comprising:
a program storage device; and
a processor, the processor operable to execute a program of instructions encoded on the program storage device, the program of instructions comprising:
a UDDI repository for a first entity that manages the UDDI repository, the UDDI repository comprising a plurality of internal web service listings, the plurality of internal web service listings facilitating discovery of a plurality of internal web services associated with the first entity;
one or more users affiliated with a second entity; and
the UDDI repository further comprising one or more user accounts corresponding to the one or more users, the one or more user accounts comprising a plurality of external web service listings isolated from the plurality of internal web service listings, the external web service listings facilitating discovery of a plurality of external web services associated with the second entity, wherein the one or more users affiliated with the second entity have limited access to the users' corresponding user accounts for maintaining the external web service listings associated with the second entity.

11. The system of claim 10, wherein the plurality of internal web service listings are listed within the UDDI repository but not listed within the one or more user accounts.

12. The system of claim 10, wherein the UDDI repository comprises an X.500 compliant directory.

13. The system of claim 10, wherein the UDDI repository comprises an LDAP directory service.

14. The system of claim 10, wherein the UDDI repository is not publicly accessible.

15. The system of claim 14, wherein the UDDI repository is accessible to users affiliated with the first entity that manages the UDDI repository.

16. The system of claim 15, wherein the users affiliated with the first entity may create and/or manage the plurality of internal web service listings and/or information within the UDDI repository.

17. The system of claim 10, wherein the granting the one or more users access to the one or more users' respective user accounts comprises allowing the one or more users to create and/or manage the plurality of external web service listings and/or information within the one or more users' respective user accounts.

18. The system of claim 10, wherein the one or more users do not have access to the plurality of internal web service listings and/or information within the UDDI repository that is not also within the one or more users' respective user accounts.

19. The system of claim 10, wherein users who are not affiliated with the first entity that manages the UDDI repository and are not provided with a corresponding user account do not have access to the UDDI repository.

20. A computer system comprising:
a processor; and
a program storage device readable by the computer system, embodying a program of instructions executable by the processor to perform method steps for providing a private UDDI repository, the method comprising:
providing a UDDI repository for a first entity that manages the UDDI repository, the UDDI repository comprising a plurality of internal web service listings, the plurality of internal web service listings facilitating discovery of a plurality of internal web services associated with the first entity;
storing, at the UDDI repository for the first entity, one or more user accounts corresponding to one or more users affiliated with a second entity, the one or more user accounts comprising a plurality of external web service listings isolated from the plurality of internal web service listings, the external web service listings facilitating discovery of a plurality of external web services associated with the second entity; and
maintaining the external web service listings associated with the second entity by granting the one or more users affiliated with the second entity limited access to the one or more users' respective user accounts.

21. The computer system of claim 20, wherein the UDDI repository comprises an X.500 compliant directory.

22. The computer system of claim 20, wherein the UDDI repository comprises an LDAP directory service.

23. The computer system of claim 20, wherein the UDDI repository is not publicly accessible.

24. The computer system of claim 23, wherein the UDDI repository is accessible to users affiliated with the first entity that manages the UDDI repository.

25. The computer system of claim 24, wherein the users affiliated with the first entity may create and/or manage the plurality of internal web service listings and/or information within the UDDI repository.

26. The computer system of claim 20, wherein the granting the one or more users access to the one or more users' respective user accounts comprises allowing the one or more users to create and/or manage the plurality of external web service listings and/or information within the one or more users' respective user accounts.

27. The computer system of claim 20, wherein the one or more users do not have access to the plurality of internal web service listings and/or information within the UDDI repository that is not also within the one or more users' respective user accounts.

28. The computer system of claim 20, wherein users who are not affiliated with the first entity that manages the UDDI repository and are not provided with a corresponding user account do not have access to the UDDI repository.

* * * * *